United States Patent
DeLand et al.

(10) Patent No.: US 11,238,754 B2
(45) Date of Patent: Feb. 1, 2022

(54) EDITING TOOL FOR MATH EQUATIONS

(71) Applicant: Pearson Education, Inc., Bloomington, MN (US)

(72) Inventors: Donald DeLand, Albuquerque, NM (US); Samuel Dooley, Albuquerque, NM (US); Lisa Eggers-Robertson, Iowa City, IA (US); Michael J. Garcia, Austin, TX (US); Charles McQuilkin, Austin, TX (US); Wayne Ostler, Pflugerville, TX (US); Jennifer Ramirez, Austin, TX (US); James Setaro, Austin, TX (US)

(73) Assignee: PEARSON EDUCATION, INC., Bloomington, MN (US)

( * ) Notice: Subject to any disclaimer, the term of this patent is extended or adjusted under 35 U.S.C. 154(b) by 303 days.

(21) Appl. No.: 16/373,521

(22) Filed: Apr. 2, 2019

(65) Prior Publication Data

US 2019/0304336 A1 Oct. 3, 2019

Related U.S. Application Data

(60) Provisional application No. 62/651,495, filed on Apr. 2, 2018.

(51) Int. Cl.
*G06F 40/00* (2020.01)
*G09B 19/02* (2006.01)
(Continued)

(52) U.S. Cl.
CPC .......... *G09B 19/02* (2013.01); *G06F 40/166* (2020.01); *G06F 40/205* (2020.01)

(58) Field of Classification Search
None
See application file for complete search history.

(56) References Cited

U.S. PATENT DOCUMENTS

2009/0024366 A1* 1/2009 Atkinson .............. G06F 40/205
703/2
2012/0189991 A1* 7/2012 Smith ................... G06F 40/205
434/201

(Continued)

OTHER PUBLICATIONS

Chen et al., "Ambiguous problem investigation in off-line mathematical expression understanding," Smc 2000 conference proceedings, pp. 2917-2922. (Year: 2000).*

(Continued)

*Primary Examiner* — Amelia L Tapp
(74) *Attorney, Agent, or Firm* — Quarles & Brady LLP

(57) ABSTRACT

The present invention automatically replaces in an assessment response a string of mathematical symbols determined to be ambiguous with an unambiguous string of mathematical symbols. An editing tool may receive an assessment response from a client over a communication network. The assessment response may comprise i) a text with a mathematical meaning and ii) a string of mathematical symbols. The text and the string of mathematical symbols represent different non-overlapping characters in the assessment response. The editing tool may match the string of mathematical symbols with a known ambiguous string of mathematical symbols and determine the mathematical meaning in the text of the assessment response. The editing tool may replace the string of mathematical symbols determined to be ambiguous with an unambiguous string of mathematical symbols to generate an updated assessment response. The editing tool may transmit the updated assessment response to the client for display.

20 Claims, 7 Drawing Sheets

(51) Int. Cl.
    *G06F 40/166*     (2020.01)
    *G06F 40/205*     (2020.01)

(56) References Cited

U.S. PATENT DOCUMENTS

2017/0161251 A1*   6/2017   Olkin ...................... G06F 40/18
2017/0220543 A1*   8/2017   Canton ................ G06F 40/111
2018/0357207 A1*  12/2018   Yi ........................ G06F 40/131

OTHER PUBLICATIONS

Jakjoud, "Representation, handling and recognition of mathematical objects: state of the art" copyright 2009 IEEE, pp. 1-12. (Year: 2009).*

Golic, "Iterative Optimum Symbol-by-Symbol Decoding and Fast Correlation Attacks" IEEE Transactions on Information Theory, vol. 47, No. 7, Nov. 2001, pp. 3040-3049. (Year: 2001).*

* cited by examiner

Assessment
Response 400

The solution requires squaring one third of the total so the equation is
1/3^2

FIG. 4

Updated
Assessment
Response 400

The solution requires squaring one third of the total so the equation is
$(1/3)^2$

FIG. 5

Assessment
Response 600

The solution requires using the function A with the input of (x+2) to
produce an output so the equation is A(x+2)

FIG. 6

Updated
Assessment
Response 600

The solution requires using the function A with the input of (x+2) to
produce an output so the equation is function A(x+2)

FIG. 7

Data Store/Database 110

| Ambiguous Strings of Mathematical Symbols 800 | Unambiguous Strings of Mathematical Symbols 810/ (Possible Meanings) 820 | Determinative Phrases 830 |
|---|---|---|
| Generalized Format<br><br>#/#^# | $(1/3)^2$ | one divided by three<br><br>1 divided by 3<br><br>one third |
| Example Match<br><br>1/3^2 | $1/(3^2)$ | three squared<br><br>3 squared |
| Generalized Format<br><br>#(x+#) | Function A(x+2) | function<br><br>inputs<br><br>outputs |
| Example Match<br><br>A(x+2) | A(x+2) | A times |

FIG. 8

EDITING TOOL FOR MATH EQUATIONS

CROSS-REFERENCE TO RELATED APPLICATION(S)

This application claims the benefit of priority from U.S. Provisional Application 62/651,495, filed under the same title on Apr. 2, 2018, the entire contents of which are incorporated herein by reference.

FIELD OF THE INVENTION

This disclosure relates to the field of systems and methods for an editing tool to edit and/or replace a string of mathematical symbols in a text field, such as a free form text entry field, determined to be ambiguous with an unambiguous string of mathematical symbols.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to automatically replace a string of mathematical symbols in a text entry field, such as, as non-limiting examples, an assessment response or a text entry on a social media website, determined to be ambiguous with an unambiguous string of mathematical symbols.

In other embodiments the user may be given an option to accept or reject updates and in yet other embodiments the user may be given an option to select an unambiguous string of mathematical symbols, from a plurality of unambiguous strings of mathematical symbols, to replace an ambiguous string of mathematical symbols entered by the user.

In yet another embodiment, the user may highlight an ambiguous string of mathematical symbols and an unambiguous string of mathematical symbols may automatically replace the ambiguous string of mathematical symbols, the user may approve or reject the replacement of the ambiguous string of mathematical symbols by the unambiguous string of mathematical symbols or the user may select an unambiguous string of mathematical symbols presented to the user, from a plurality of unambiguous strings of mathematical symbols, to replace the ambiguous string of mathematical symbols entered by the user.

The editing tool may receive over a communication network from a client an input signal comprising a sequence of one electronic character at a time of an assessment response. The assessment response may comprises i) a text that conveys a mathematical meaning and ii) a string of mathematical symbols. The text and the string of mathematical symbols may represent different non-overlapping characters in the assessment response.

The editing tool may compare in real-time the string of mathematical symbols entered by the user with a plurality of ambiguous strings of mathematical symbols that are known to have two or more possible meanings. The string of mathematical symbols and ambiguous string of mathematical symbols may be generalized by replacing numbers and/or variables with wildcard characters to make it easier to match the user entered string of mathematical symbols with the known ambiguous strings of mathematical symbols.

The editing tool may match the string of mathematical symbols entered by the user with an ambiguous string of mathematical symbols in the plurality of ambiguous strings of mathematical symbols. The ambiguous string of mathematical symbols are previously known to have a plurality of possible meanings, such as a first possible meaning and a second possible meaning.

The editing tool may read a first plurality of determinative phrases associated with the first possible meaning, a second plurality of determinative phrases associated with the second possible meaning from a database and so on for each additional possible meaning.

The editing tool may parse the text entered by the user that conveys the mathematical meaning and match at least one of the first plurality of determinative phrases to a part of the text or match at least one of the second plurality of determinative phrases to a part of the text. In some embodiments, the editing tool may also i) parse a course description and/or syllabus for the class being taken by the user for matches in the first or second plurality of determinative phrases, ii) consider a level of the class or a level of the user and/or iii) consider where (domain) the text is being entered. As an example, text entered in a social media website may use different rules or be weighted towards different unambiguous strings of mathematical symbols when compared against text entered as an assessment response to a question as part of a test for a class or course.

The editing tool may read from the database an unambiguous string of mathematical symbols based on whether the at least one of the first plurality of determinative phrases or the at least one of the second plurality of determinative phrases matched a part of the text. In preferred embodiments, the unambiguous string of mathematical symbols is generalized, so the specific numbers and/or variables from the string of mathematical symbols entered by the user may be inserted over any wildcard placeholders in the unambiguous string of mathematical symbols. The database may be organized, as non-limiting examples, as a look-up table or a flat file.

The editing tool may replace in the assessment response the string of mathematical symbols that has been determined to be ambiguous with the unambiguous string of mathematical symbols to thereby generate an updated assessment response. The editing tool may transmit the updated assessment response to the client for display.

In some embodiments, the user may be given an option to accept or reject the replacement of the unambiguous string of mathematical symbols to the string of mathematical symbols entered by the user. In other embodiments, a plurality of unambiguous strings of mathematical symbols, determined to be the most likely intended by the user, may be presented for selection by the user. In this case, the selected unambiguous string of mathematical symbols will be used to replace the string of mathematical symbols originally entered by the user.

The above features and advantages of the present invention will be better understood from the following detailed description taken in conjunction with the accompanying drawings.

BRIEF DESCRIPTION OF THE DRAWINGS

FIGS. 4 and 6 illustrate specific examples of assessment responses that each contain an ambiguous string of mathematical symbols that may have been entered and displayed on a client of the user.

FIGS. 5 and 7 illustrate specific examples regarding the corresponding assessment responses of FIGS. 4 and 6, where the editing tool has replaced the ambiguous string of mathematical symbols with an unambiguous string of mathematical symbols in the assessment responses.

FIG. 8 illustrates an example data store/database, greatly reduced to assist in explaining the invention, that stores a plurality of ambiguous strings of mathematical symbols. The database also stores, for each ambiguous string of mathematical symbols a plurality of unambiguous strings of mathematical symbols (possible meanings). The database also store, for each unambiguous string of mathematical symbols one or more determinative phrases.

DETAILED DESCRIPTION

Figure 1:
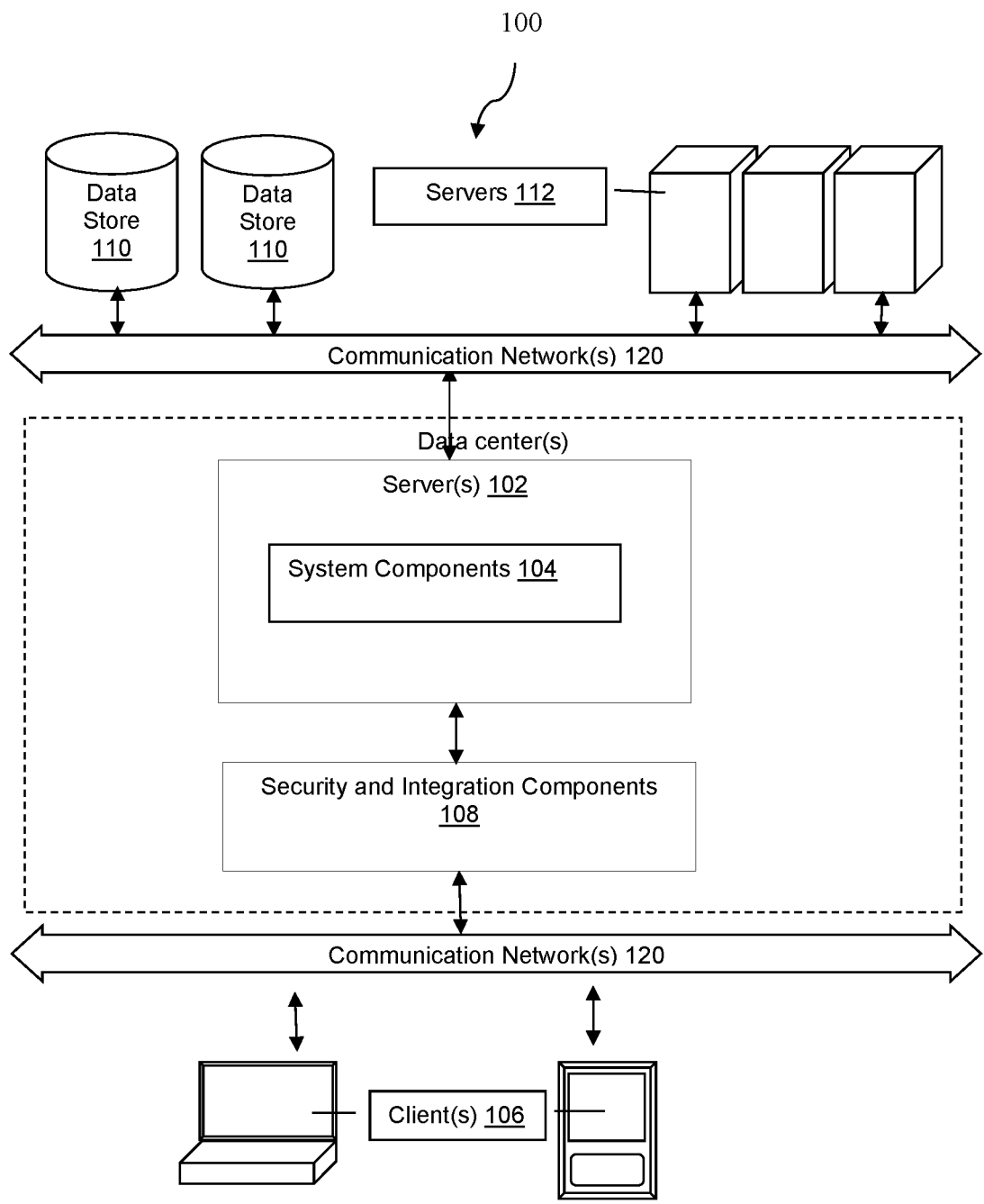
FIG. 1 illustrates a system level block diagram for a non-limiting example of a distributed computing environment that may be used in practicing the invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
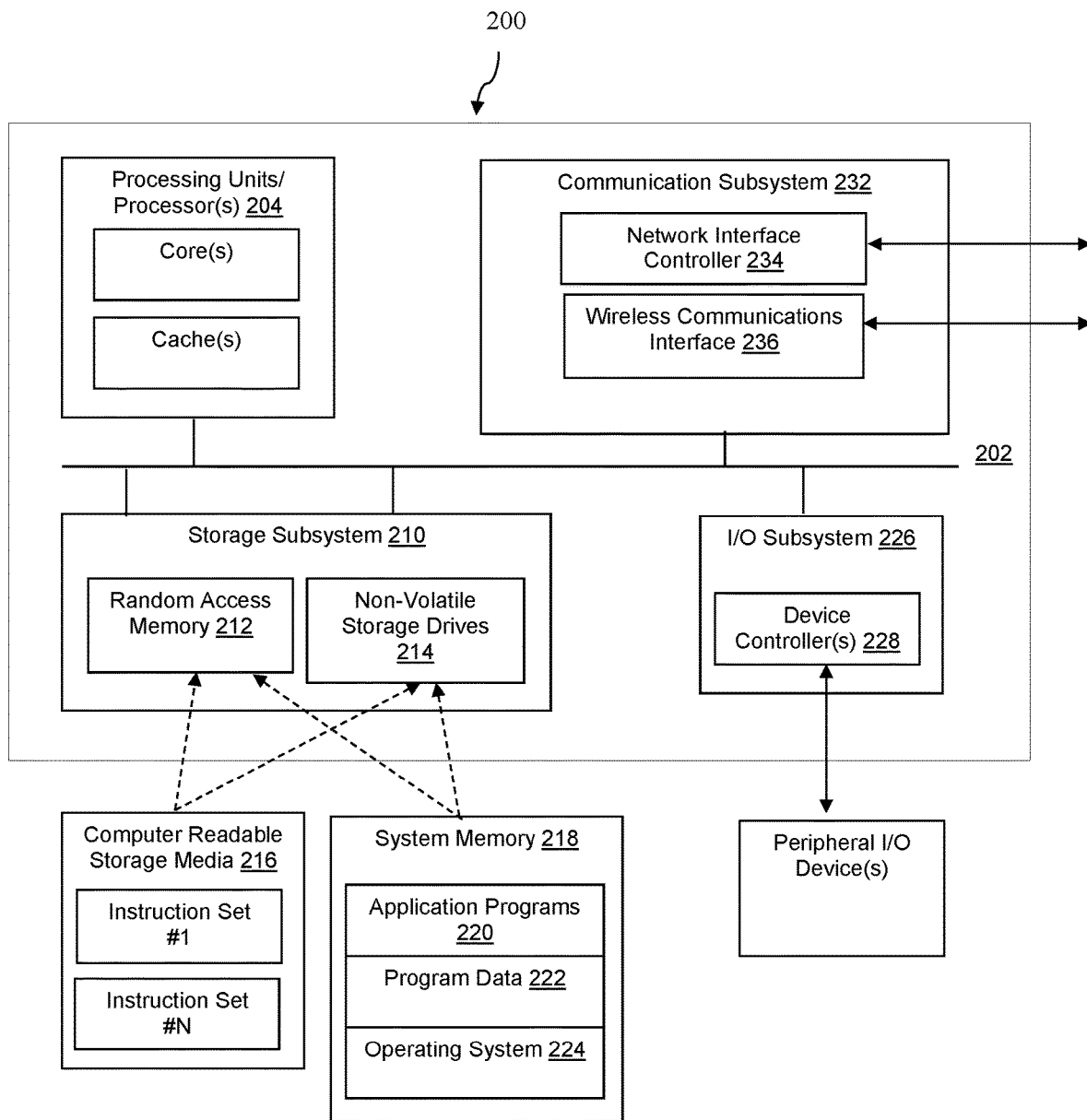
FIG. 2 illustrates a system level block diagram for an illustrative computer system that may be used in practicing the invention.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

The method and process of the present invention is herein defined to be performed automatically by the hardware and software of the described system. Unless the description specifically states that an action may be performed by a user, all other actions are hereby defined to be done automatically, i.e., by computer hardware and software and without human intervention.

Figure 3:
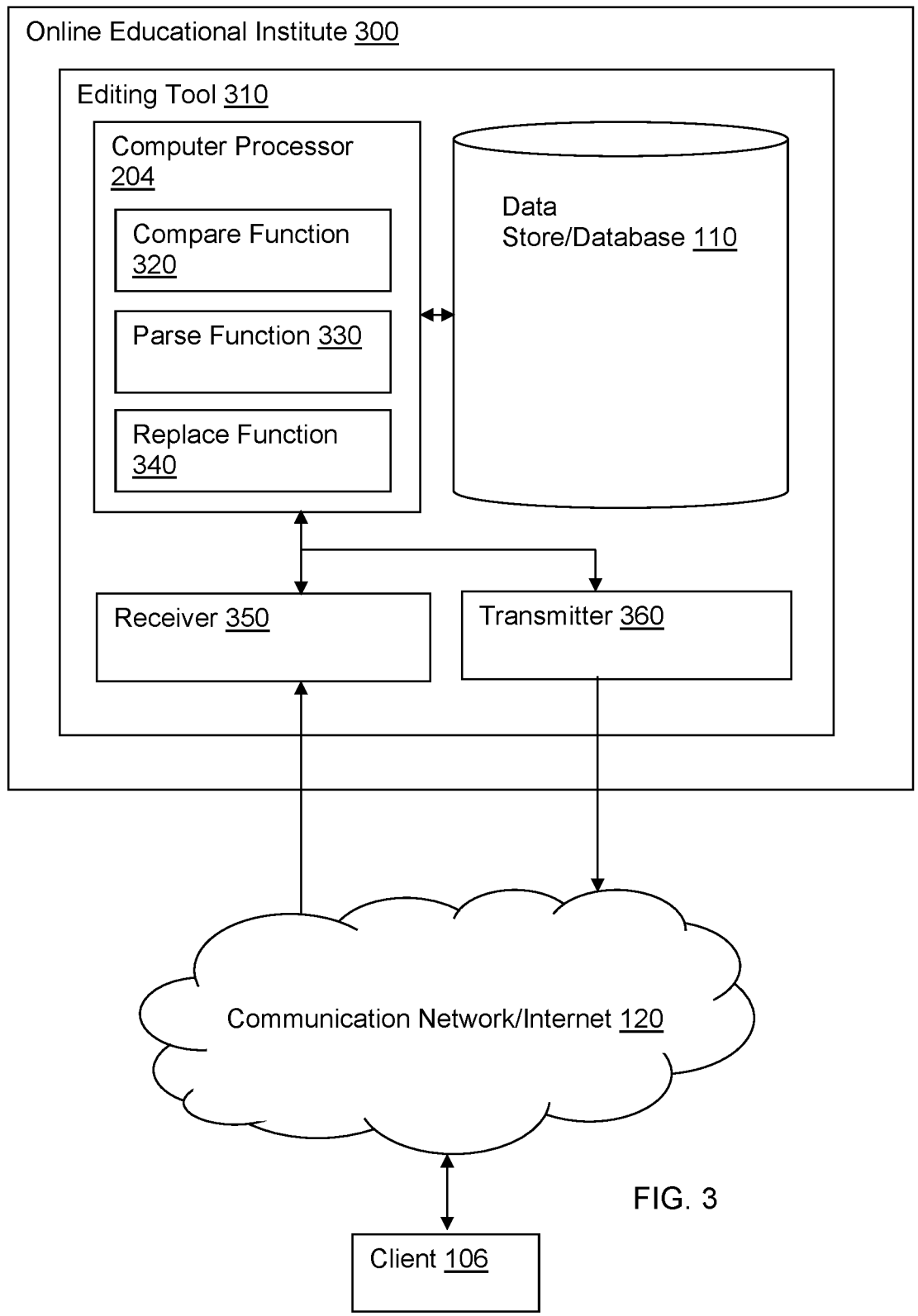
FIG. 3 illustrates a system level block diagram of an online educational institute with the components that may be used to practice the invention.

With reference to FIG. 3, a block diagram of an example online educational institute 300 is illustrated. The online educational institute 300 may offer, register and administer a plurality of online educational courses to a plurality of users. Each user may register and take one or more classes with the online education institute.

As part of a class, such as while participating in real-time in an online class, performing a project for the class or answering an assessment question as part of a test in the class, the user may enter an assessment response 400, 600. The user may enter the assessment response 400, 600 by typing, sequentially one character at a time, on a client 106. The client 106 may transmit, and the editing tool 310 may receive, a signal representing a sequence of characters, one character at a time, of the assessment response 400, 600 from the client 106.

The editing tool 310 may be configured to automatically replace in an assessment response 400, 600 a string of mathematical symbols determined to be ambiguous with an unambiguous string of mathematical symbols 810. The editing tool 310 may comprise a receiver 350 in communication with the client 106. The receiver 350 may receive characters transmitted from the client 106 over a communication network 120. The editing tool 310 may also comprise a transmitter 360 in communication with the client 106. The transmitter 360 may transmit a display with an updated assessment response 400, 600 to the client 106 over the communication network 120. The editing tool 310 may also comprise a database 110 running on a hardware server.

In other embodiments the user may be given an option by the editing tool 310 to accept or reject updates and in yet other embodiments the user may be given an option by the editing tool 310 to select an unambiguous string of mathematical symbols, from a plurality of unambiguous strings of mathematical symbols, to replace an ambiguous string of mathematical symbols entered by the user.

In yet another embodiment, the user may highlight an ambiguous string of mathematical symbols and an unambiguous string of mathematical symbols may automatically replace the ambiguous string of mathematical symbols, the user may approve or reject the replacement of the ambiguous string of mathematical symbols by the unambiguous string of mathematical symbols or the user may select an unambiguous string of mathematical symbols presented to the user, from a plurality of unambiguous strings of mathematical symbols, to replace the ambiguous string of mathematical symbols entered by the user.

The database 110 may store a plurality of strings of mathematical symbols that are known to be ambiguous (ambiguous strings of mathematical symbols 800), a plurality of strings of mathematical symbols that are not ambiguous (unambiguous strings of mathematical symbols 810) and a plurality of determinative phrases 830 that when found in the text of an assessment response 400, 600 may be used to determine a meaning out of a plurality of possible meanings 820 for the ambiguous string of mathematical symbols.

In another embodiment, the database 110 may store a plurality of ambiguous strings of mathematical symbols 800. Each of the plurality of ambiguous strings of mathematical symbols 800 may be associated with a plurality of possible meanings 820 based on a math level of a user entering the assessment response 400, 600. Each of the plurality of possible meanings may be associated with one or more determinative phrases 830 and each of the one or more determinative phrases 830 may be associated with an unambiguous string of mathematical symbols 820.

The editing tool 310 may also comprise a computer processor 204 that comprises hardware and software necessary for a compare function 320, a parse function 330 and a replace function 340, as further described below, so that the computer processor 204 may compare known ambiguous strings of mathematical symbols 800 to free-form entered text, parse the free-form entered text for matches in the text with determinative phrases 830 and replace strings of mathematical symbols determined to be ambiguous with unambiguous strings of mathematical symbols 820 based on the matched determinative phrase(s) 830.

Figure 9:
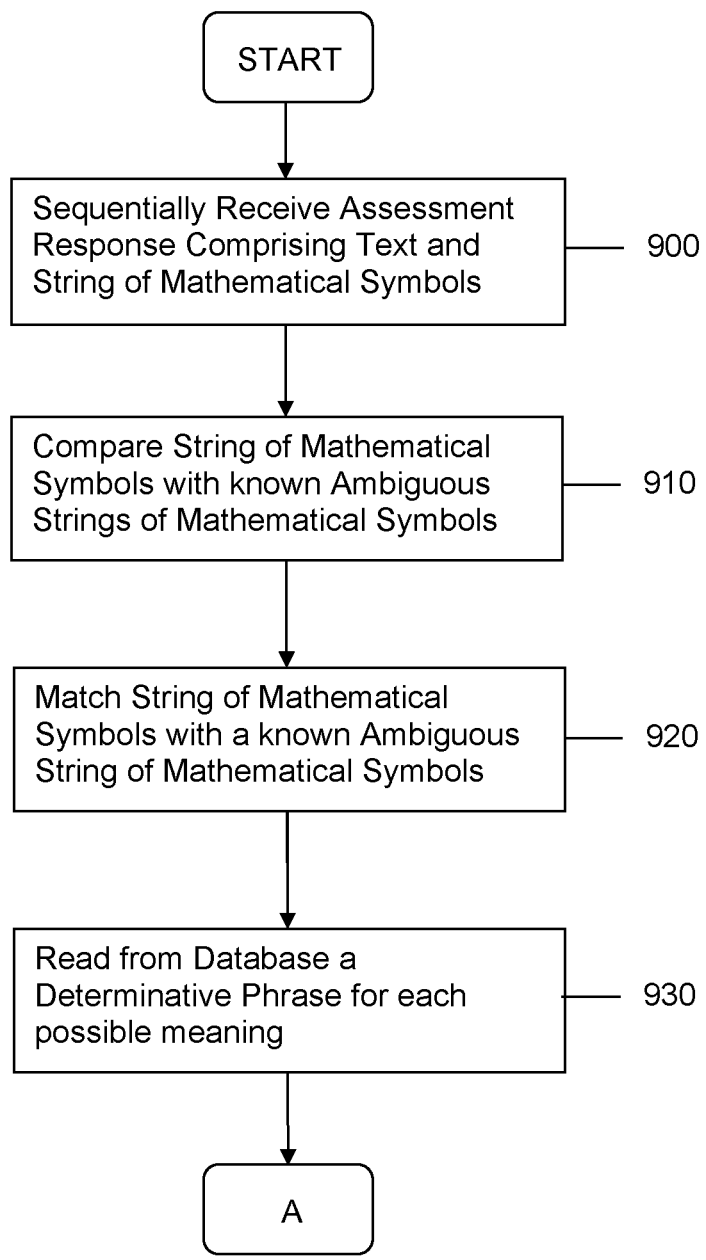
FIGS. 9 and 10 illustrate a flowchart of a possible method for practicing the invention.

With reference to FIG. 9, the receiver 350, the transmitter 360, the database 110 and the computer processor 204 may be configured to receive over the communication network 120 from the client 106 an input signal comprising a sequence of one electronic character at a time of an assessment response 400, 600. (Step 900) As a non-limiting example, the assessment response 400, 600 may be entered as a response to an assessment question asked as part of an online class.

An example assessment response 400, 600 is illustrated in FIG. 4. The assessment response 400, 600 may comprise a text, possibly entered in a free-format style, i.e., entered sequentially one character at a time as desired by the user with few or no restrictions on character entry, that conveys a mathematical meaning, and a string of mathematical symbols. The text and the string of mathematical symbols represent different non-overlapping characters in the assessment response 400, 600.

As a non-limiting example, the assessment response 400, 600 in FIG. 4 is "[t]he solution requires squaring one third of the total so the equation is 1/3^2." This assessment response 400, 600 comprises a non-overlapping text of "[t]he solution requires squaring one third of the total so the equation is" and a string of mathematical symbols of "1/3^2."

The editing tool 310, using a compare function 340, may compare in real-time, i.e., for each character entered, the string of mathematical symbols with a plurality of ambiguous strings of mathematical symbols 800, that are stored in the database 110, that are known to have two or more possible meanings. (Step 910) It should be appreciated that for each character entered, several strings of mathematical symbols may be compared to the plurality of ambiguous strings of mathematical symbols 800. Thus, the comparing function 340, after receiving the last character of "2," may compare the strings of "^2," "3^2," "/3^2" and "1/3^2" against the plurality of ambiguous strings of mathematical symbols 800.

The editing tool 310, using a parsing function 330, may parse the text and attempt to match these strings of mathematical symbols with an ambiguous string of mathematical symbols 800 in a plurality of ambiguous strings of mathematical symbols 800. (Step 920) The ambiguous string of mathematical symbols 800 has two or more meanings and thus may have at least a first possible meaning and a second possible meaning. Continuing with our example, as illustrated in FIG. 8, the string of mathematical symbols of "1/3^2" may have a first meaning of $(1/3)^2$ and a second meaning of $1/(3^2)$.

As part of the matching process, the string of mathematical symbols in the assessment response 400, 600 is preferably generalized by, as a non-limiting example, replacing all of the numbers (regardless of the number of digits within the number) with a wildcard placeholder that represents any number and a wildcard placeholder that represents any variable. In this example, the wildcard placeholder is illustrated as a "#" symbol. Thus, the string of mathematical symbols of "1/3^2" in the assessment response 400, 600 may be generalized to "#/#^#" as shown in FIG. 8 by replacing the numbers with the wildcard placeholder.

The editing tool 310 may read a first plurality of determinative phrases 830 associated with the first possible meaning and a second plurality of determinative phrases 830 associated with the second possible meaning from the database 110 for the ambiguous string of mathematical symbols 800. (Step 930) Additional determinative phrases 830 may be read for each additional possible meaning for the ambiguous string of mathematical symbols 800. Thus, the determinative phrases 830 of "one divided by three," "1 divided by 3" and "one third" may be read for the meaning $(1/3)^2$ and the determinative phrases 830 of "three squared" and "3 squared" may be read for the meaning $1/(3^2)$ from the database 110. The determinative phrases 830, if found in the text, may be used to determine which of these meanings is the correct meaning for the string of mathematical symbols.

Figure 10:
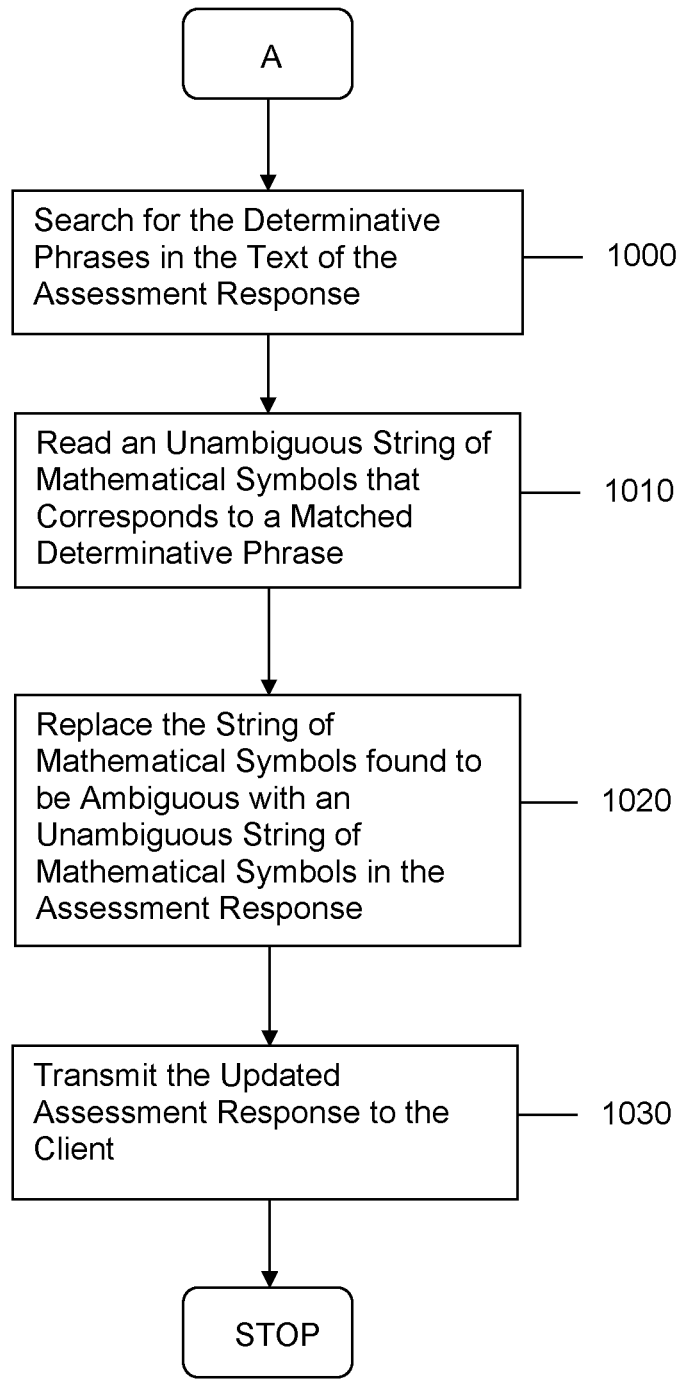

With reference to FIG. 10, the editing tool 310 may parse the text that conveys the mathematical meaning and attempt to match one or more of the determinative phrases 830 for each of the possible meanings of the ambiguous string of mathematical symbols 800 to a part of the text. (Step 1000) Thus, in this running example the determinative phrases 830 of "one divided by three," "1 divided by 3," "one third," 'three squared" and "3 squared" are searched for in the text of "[t]he solution requires squaring one third of the total so the equation is" in the assessment response 400, 600.

The editing tool 310 may read from the database 110 an unambiguous string of mathematical symbols 810 based on which one or more determinative phrases 830 were matched in the text. (Step 1010) In this example the determinative phrase 830 of "one third" is in the text of the assessment response 400, 600 and the database 110 may associate this determinative phrase 830 with the unambiguous string of mathematical symbols 810 of "$(1/3)^2$." It should be appreciated that the wildcard placeholders may be replaced by the original number(s) and/or original variables in the string of mathematical symbols in creating the unambiguous string of mathematical symbols 810.

The editing tool 310 may replace in the assessment response 400, 600 the string of mathematical symbols that has been determined to be ambiguous with the unambiguous string of mathematical symbols 810 to thereby generate an updated assessment response 400, 600. (Step 1020) In this running example, the assessment response 400, 600 in FIG. 4 of " . . . 1/3^2" is replaced with " . . . $(1/3)^2$" as illustrated in FIG. 5. The editing tool 310 may transmit the updated assessment response 400, 600, as shown in FIG. 5, to the client 106 for display to the user. (Step 1030).

Another example assessment response 400, 600 is illustrated in FIG. 6. The assessment response 400, 600 may comprise a text, possibly entered in a free-format style, i.e., entered sequentially one character at a time as desired by the user with few or no restrictions on character entry, that conveys a mathematical meaning, and a string of mathematical symbols. (Step 900) The text and the string of mathematical symbols represent different non-overlapping characters in the assessment response 400, 600.

As a non-limiting example, the assessment response 400, 600 in FIG. 6 is "[t]he solution requires using the function A with the input of (x+2) to produce an output so the equation is A(x+2)." This assessment response 400, 600 comprises a non-overlapping text of "[t]he solution requires using the function A with the input of" and a string of mathematical symbols of "A(x+2)."

The editing tool 310, using the compare function 320, may compare in real-time, i.e., for each character entered, the string of mathematical symbols with a plurality of ambiguous strings of mathematical symbols 800, that are stored in the database 110, that are known to have two or more possible meanings. (Step 910) It should be appreciated that for each character entered, several strings of mathematical symbols may be compared to the plurality of ambiguous strings of mathematical symbols 810. Thus, the comparing function 320, after receiving the last character of ")," may compare the strings of "2)," "+2)," "x+2)," "(x+2)" and "A(x+2)" against the plurality of ambiguous strings of mathematical symbols 800.

The editing tool 310, using the parsing function 330, may parse the text and attempt to match these strings of mathematical symbols with an ambiguous string of mathematical symbols 800 in a plurality of ambiguous strings of mathematical symbols 800. (Step 920) The ambiguous string of mathematical symbols 800 has two or more meanings and thus may have at least a first possible meaning and a second possible meaning. Continuing with our example, as illustrated in FIG. 8, the string of mathematical symbols of "A(x+2)" may have a first meaning of function A(x+2) and a second meaning of just A(x+2).

As part of the matching process, the string of mathematical symbols in the assessment response 400, 600 is preferably generalized by, as a non-limiting example, replacing all of the numbers (regardless of the number of digits within the number) with a wildcard placeholder that represents any number and a wildcard placeholder that represents any variable. In this example, the wildcard placeholder is illustrated as a "#" symbol. Thus, the string of mathematical symbols of "A(x+2)" in the assessment response 400, 600 may be generalized to "#(#+#)" as shown in FIG. 8 by replacing the numbers and variables with the wildcard placeholder.

If one or more determinative phrases 830 are found for two or more unambiguous strings of mathematical symbols 810 or possible meanings, the determinative phrase 830 found closest to the string of mathematical symbols in the assessment response 400, 600 may be used to determine the intended meaning of the string of mathematical symbols.

The editing tool 310 may read a first plurality of determinative phrases 830 associated with the first possible meaning and a second plurality of determinative phrases 830 associated with the second possible meaning from the database 110 for the ambiguous string of mathematical symbols 800. (Step 930) Additional determinative phrases 830 may be read for each additional possible meaning for the ambiguous string of mathematical symbols 800. Thus, the determinative phrases 830 of "function," "inputs" and "outputs" may be read for the meaning function A(x+2) and the determinative phrase 830 of "A times" may be read for the meaning A(x+2) from the database 110. The determinative phrases 830, if found in the text, may be used to determine which of these meanings is the correct meaning for the string of mathematical symbols.

The editing tool 310 may parse the text that conveys the mathematical meaning and attempt to match one or more of the determinative phrases 830 for each of the possible meanings of the ambiguous string of mathematical symbols 800 to a part of the text. (Step 1000) Thus, in this running example the determinative phrases 830 of "function," "input," "output," and "A times" are searched for in the text of "[t]he solution requires using function A with the input of (X+2) to produce an output so the equation is A(x+2)" in the assessment response 400, 600.

The editing tool 310 may read from the database 110 an unambiguous string of mathematical symbols 810 based on which one or more determinative phrases 830 were matched in the text. (Step 1010) In this example the determinative phrase 830 of "function," "input" and "output" are in the text of the assessment response 400, 600 and the database 110 may associate these determinative phrases 830 with the unambiguous string of mathematical symbols 810 of "function A(x+2)." It should be appreciated that the wildcard placeholders may be replaced by the original number(s) and/or original variable(s) in the string of mathematical symbols in creating the unambiguous string of mathematical symbols 810.

The editing tool 310 may replace in the assessment response 400, 600 the string of mathematical symbols that has been determined to be ambiguous with the unambiguous string of mathematical symbols 810 to thereby generate an updated assessment response 400, 600. (Step 1020) In this running example, the assessment response 400, 600 in FIG. 6 of " . . . A(x+2)" is replaced with " . . . function A(x+2)" as illustrated in FIG. 5. The editing tool 310 may transmit the updated assessment response 400, 600, as shown in FIG. 5, to the client 106 for display to the user. (Step 1030)

In some embodiments the user may be consulted prior to replacing the string of mathematical symbols with the unambiguous string of mathematical symbols 810. Thus, a pop-up or question may be sent to the user to approve of replacing the string of mathematical symbols, that have been determined to be ambiguous, with the unambiguous string of mathematical symbols 810. If the user approves, the string of mathematical symbols may be replaced by the unambiguous string of mathematical symbols 810 and the string of mathematical symbols are not replaced with the unambiguous string of mathematical symbols 810 if the user does not approve of the replacement.

In another embodiment, the editing tool 310 may display two or more of the unambiguous strings of mathematical symbols 810, after detecting a string of mathematical symbols is ambiguous, and allow the user to select the unambiguous string of mathematical symbols 810 with the meaning intended by the user. In a preferred embodiment, the editing tool 310 may order and/or select the most likely intended unambiguous strings of mathematical symbols 810, from a plurality of unambiguous strings of mathematical symbols 810, for display and selection by the user based on the determinative phrases 830 found in i) the text, course description and/or syllabus and/or ii) the level of the course and/or the user.

In another embodiment, the editing tool 310 may, in addition to using the assessment response 400, 600, parse and match the determinative phrases 830 with character strings in a syllabus or course material for the class. Matching one or more determinative phrases 830 in the syllabus or the course material may be used to select the possible meaning as the possible meaning associated with the matched determinative phrase(s) 830.

In another embodiment, the editing tool 310 may look at the grade level of the user or the grade level of the class to select between different possible meanings. Possible meanings that are typically taught to higher level users or in higher level classes may be assigned a higher level and disregarded and/or not used in determining the unambiguous string of mathematical symbols 810 for lower level classes.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. An editing tool configured to automatically replace in an assessment response a string of mathematical symbols determined to be ambiguous with an unambiguous string of mathematical symbols, comprising:
    a receiver in communication with a client for receiving characters transmitted from the client over a communication network;
    a transmitter in communication with the client for transmitting a display to the client over the communication network;
    a database running on a hardware server; and
    a computer processor, wherein the receiver, the transmitter, the database and the computer processor are configured to:
        receive over the communication network from the client an input signal comprising a sequence of one electronic character at a time of an assessment response, wherein the assessment response comprises:
            i) a text that conveys a mathematical meaning and
            ii) a string of mathematical symbols, wherein the text and the string of mathematical symbols represent different non-overlapping characters in the assessment response;
        compare in real-time the string of mathematical symbols with a plurality of ambiguous strings of mathematical symbols, that are stored in the database, that are known to have two or more possible meanings,
        match the string of mathematical symbols with an ambiguous string of mathematical symbols in the plurality of ambiguous strings of mathematical symbols, wherein the ambiguous string of mathematical symbols has a first possible meaning and a second possible meaning,
        read a first plurality of determinative phrases associated with the first possible meaning and a second plurality of determinative phrases associated with the second possible meaning from the database,
        parse the text that conveys the mathematical meaning and match at least one of the first plurality of determinative phrases to a part of the text or match at least one of the second plurality of determinative phrases to a part of the text,
        read from the database an unambiguous string of mathematical symbols based on whether the at least one of the first plurality of determinative phrases or the at least one of the second plurality of determinative phrases matched a part of the text,
        replace in the assessment response the string of mathematical symbols that has been determined to be ambiguous with the unambiguous string of mathematical symbols to thereby generate an updated assessment response, and
        transmit the updated assessment response to the client for display.

2. The editing tool of claim 1, wherein the database comprises the plurality of ambiguous strings of mathematical symbols, wherein each of the plurality of ambiguous strings of mathematical symbols is associated with a plurality of possible meanings, each of the plurality of possible meanings is associated with one or more determinative phrases and each of the one or more determinative phrases is associated with an unambiguous string of mathematical symbols.

3. The editing tool of claim 1, wherein the database comprises the plurality of ambiguous strings of mathematical symbols, wherein each of the plurality of ambiguous strings of mathematical symbols is associated with a plurality of possible meanings based on a math level of a user entering the assessment response, each of the plurality of possible meanings is associated with one or more determinative phrases and each of the one or more determinative phrases is associated with an unambiguous string of mathematical symbols.

4. The editing tool of claim 1, wherein the assessment response is an answer entered by a user in response to a math question displayed on the client as part of an online educational class.

5. The editing tool of claim 1, wherein a wild card character replaces a number in the string of mathematical symbols before comparing the string of mathematical symbols with the plurality of ambiguous strings of mathematical symbols.

6. The editing tool of claim 1, wherein the receiver, the transmitter, the database and the computer processor are also configured to:
 transmit the unambiguous string of mathematical symbols to the client for a user to approve; and
 upon a detection of an approval from the client, replace the string of mathematical symbols with the unambiguous string of mathematical symbols in the assessment response.

7. The editing tool of claim 1, wherein the received, the transmitter, the database and the computer processor are also configured to:
 transmit the unambiguous string of mathematical symbols to the client for a user to approve; and
 upon a detection of a rejection from the client, the string of mathematical symbols is not replaced with the unambiguous string of mathematical symbols in the assessment response.

8. A method for automatically replacing in an assessment response a string of mathematical symbols determined to be ambiguous with an unambiguous string of mathematical symbols, comprising the steps of:
 receiving by an editing tool over a communication network from a client an input signal comprising a sequence of one electronic character at a time of an assessment response, wherein the assessment response comprises:
  i) a text that conveys a mathematical meaning and
  ii) a string of mathematical symbols, wherein the text and the string of mathematical symbols represent different non-overlapping characters in the assessment response;
 comparing by the editing tool in real-time the string of mathematical symbols with a plurality of ambiguous strings of mathematical symbols that are stored in a database that are known to have two or more possible meanings;
 matching by the editing tool the string of mathematical symbols with an ambiguous string of mathematical symbols in the plurality of ambiguous strings of mathematical symbols, wherein the ambiguous string of mathematical symbols is known to have a first possible meaning and a second possible meaning;
 reading by the editing tool a first plurality of determinative phrases associated with the first possible meaning and a second plurality of determinative phrases associated with the second possible meaning from the database;
 parsing by the editing tool the text that conveys the mathematical meaning and matching at least one of the first plurality of determinative phrases to a part of the text or matching at least one of the second plurality of determinative phrases to a part of the text;
 reading by the editing tool from the database an unambiguous string of mathematical symbols based on whether the at least one of the first plurality of determinative phrases or the at least one of the second plurality of determinative phrases matched a part of the text;
 replacing in the assessment response by the editing tool the string of mathematical symbols that has been determined to be ambiguous with the unambiguous string of mathematical symbols to thereby generate an updated assessment response; and
 transmitting by the editing tool the updated assessment response to the client for display.

9. The method of claim 8, wherein the database comprises the plurality of ambiguous strings of mathematical symbols, wherein each of the plurality of ambiguous strings of mathematical symbols is associated with a plurality of possible meanings, each of the plurality of possible meanings is associated with one or more determinative phrases and each of the one or more determinative phrases is associated with an unambiguous string of mathematical symbols.

10. The method of claim 8, wherein the database comprises the plurality of ambiguous strings of mathematical symbols, wherein each of the plurality of ambiguous strings of mathematical symbols is associated with a plurality of possible meanings based on a math level of a user entering the assessment response, each of the plurality of possible meanings is associated with one or more determinative phrases and each of the one or more determinative phrases is associated with an unambiguous string of mathematical symbols.

11. The method of claim 8, wherein the assessment response is an answer entered by a user in response to a math question displayed on the client as part of an online educational class.

12. The method of claim 8, wherein a wild card character replaces a number in the string of mathematical symbols before comparing the string of mathematical symbols with the plurality of ambiguous strings of mathematical symbols.

13. The method of claim 8, further comprising the steps of:
 transmitting the unambiguous string of mathematical symbols to the client for a user to approve; and
 triggered by a detection of an approval from the client, replacing the string of mathematical symbols with the unambiguous string of mathematical symbols in the assessment response.

14. The method of claim 8, further comprising the steps of:
 transmitting the unambiguous string of mathematical symbols to the client for a user to approve; and
 triggered by detecting a rejection from the client, the string of mathematical symbols is not replaced with the rejected unambiguous string of mathematical symbols in the assessment response.

15. A method for automatically replacing in an assessment response a string of mathematical symbols determined to be ambiguous with an unambiguous string of mathematical symbols, comprising the steps of:
 receiving by an editing tool an assessment response, comprising one character at a time in sequence from a client over a communication network, wherein the assessment response comprises:

i) a text comprising a mathematical meaning and
ii) a string of mathematical symbols, wherein the text and the string of mathematical symbols represent different non-overlapping characters in the assessment response;

comparing by the editing tool in real-time the string of mathematical symbols with a plurality of ambiguous strings of mathematical symbols that are stored in a database that are known to have two or more possible meanings;

matching by the editing tool the string of mathematical symbols with a known ambiguous string of mathematical symbols in the plurality of ambiguous strings of mathematical symbols, wherein the ambiguous string of mathematical symbols is known to have a first possible meaning and a second possible meaning;

reading by the editing tool a first plurality of determinative phrases associated with the first possible meaning and a second plurality of determinative phrases associated with the second possible meaning from the database; determining by the editing tool the mathematical meaning in the text of the assessment response;

parsing by the editing tool the text that conveys the mathematical meaning and matching at least one of the first plurality of determinative phrases to a part of the text or matching at least one of the second plurality of determinative phrases to a part of the text;

reading by the editing tool from the database an unambiguous string of mathematical symbols based on whether the at least one of the first plurality of determinative phrases or the at least one of the second plurality of determinative phrases matched a part of the text;

replacing by the editing tool in the assessment response the string of mathematical symbols determined to match the known ambiguous string of mathematical symbols with the unambiguous string of mathematical symbols to thereby generate an updated assessment response, wherein the unambiguous string of mathematical symbols has the mathematical meaning determined from the text of the assessment response; and transmitting by the editing tool the updated assessment response to the client for display.

16. The method of claim 15, wherein a database comprises the plurality of ambiguous strings of mathematical symbols, wherein each of the plurality of ambiguous strings of mathematical symbols is associated with a plurality of possible meanings, each of the plurality of possible meanings is associated with one or more determinative phrases and each of the one or more determinative phrases is associated with an unambiguous string of mathematical symbols.

17. The method of claim 15, wherein the database comprises the plurality of ambiguous strings of mathematical symbols, wherein each of the plurality of ambiguous strings of mathematical symbols is associated with a plurality of possible meanings based on a math level of a user entering the assessment response, each of the plurality of possible meanings is associated with one or more determinative phrases and each of the one or more determinative phrases is associated with an unambiguous string of mathematical symbols.

18. The method of claim 15, wherein the assessment response is an answer entered by a user in response to a math question displayed on the client as part of an online educational class.

19. The method of claim 15, wherein a wild card character replaces a number in the string of mathematical symbols before comparing the string of mathematical symbols with the plurality of ambiguous strings of mathematical symbols.

20. The method of claim 15, further comprising the steps of:

transmitting the unambiguous string of mathematical symbols to the client for a user to approve; and
triggered by a detection of an approval from the client, replacing the string of mathematical symbols with the unambiguous string of mathematical symbols in the assessment response.

\* \* \* \* \*